(12) United States Patent
Pervan et al.

(10) Patent No.: US 7,802,411 B2
(45) Date of Patent: Sep. 28, 2010

(54) MECHANICAL LOCKING SYSTEM FOR FLOOR PANELS

(75) Inventors: Darko Pervan, Viken (SE); Niclas Håkansson, Helsingborg (SE); Per Nygren, Ramlösa (SE)

(73) Assignee: Valinge Innovation AB, Viken (BE)

( * ) Notice: Subject to any disclaimer, the term of this patent is extended or adjusted under 35 U.S.C. 154(b) by 0 days.

(21) Appl. No.: 11/822,681

(22) Filed: Jul. 9, 2007

(65) Prior Publication Data

US 2008/0000186 A1    Jan. 3, 2008

Related U.S. Application Data

(63) Continuation of application No. 10/970,282, filed on Oct. 22, 2004, now Pat. No. 7,454,875.

(51) Int. Cl.
*E04C 2/38* (2006.01)
(52) U.S. Cl. .................... 52/586.2; 52/592.1
(58) Field of Classification Search .......... 52/578, 52/582.1, 582.2, 586.1, 591.5, 592.1, 536, 52/396.04, 396.1, 285.1; 403/329
See application file for complete search history.

(56) References Cited

U.S. PATENT DOCUMENTS

| | | | |
|---|---|---|---|
| 124,228 A | 3/1872 | Stuart | |
| 1,194,636 A | 8/1916 | Joy | |
| 1,723,306 A | 8/1929 | Sipe | |
| 1,743,492 A | 1/1930 | Sipe | |
| 1,809,393 A | 6/1932 | Rockwell | |
| 1,902,716 A * | 3/1933 | Newton | 52/586.2 |
| 2,026,511 A | 12/1935 | Storm | |
| 2,596,280 A | 5/1952 | Nystrom | |
| 2,732,706 A | 1/1956 | Friedman | |
| 2,740,167 A | 4/1956 | Rowley | |
| 2,863,185 A | 12/1958 | Riedi | |
| 2,865,058 A | 12/1958 | Andersson | |
| 3,023,681 A | 3/1962 | Worson | |
| 3,077,703 A | 2/1963 | Bergstrom | |
| 3,325,585 A | 6/1967 | Brenneman | |
| 3,378,958 A | 4/1968 | Parks et al. | |
| 3,512,324 A | 5/1970 | Reed | |
| 3,517,927 A | 6/1970 | Kennel | |

(Continued)

FOREIGN PATENT DOCUMENTS

CA    2456513 A1 *   2/2003

(Continued)

OTHER PUBLICATIONS

European Search Report (ESR) for European Patent Application No. 04025167.0, filed Oct. 22, 2004, published as EP 1 650 375 A1, on Apr. 26, 2006.

(Continued)

*Primary Examiner*—Robert J Canfield
*Assistant Examiner*—Christine T Cajilig
(74) *Attorney, Agent, or Firm*—Buchanan Ingersoll & Rooney PC

(57) ABSTRACT

A tongue adapted for being received in a sidewardly open groove of a floor panel, wherein in the tongue, which is of an elongated shape, when received in the groove is displaceable in a plane substantially parallel with a front face of the floor panel.

24 Claims, 13 Drawing Sheets

U.S. PATENT DOCUMENTS

| | | | |
|---|---|---|---|
| 3,526,071 A | 9/1970 | Watanabe | |
| 3,535,844 A | 10/1970 | Glaros | |
| 3,572,224 A | 3/1971 | Perry | |
| 3,579,941 A | 5/1971 | Tibbals | |
| 3,720,027 A | 3/1973 | Christensen | |
| 3,742,669 A | 7/1973 | Mansfeld | |
| 3,760,547 A | 9/1973 | Brenneman | |
| 3,849,235 A | 11/1974 | Gwynne | |
| 3,919,820 A | 11/1975 | Green | |
| 4,082,129 A | 4/1978 | Morelock | |
| 4,100,710 A | 7/1978 | Kowallik | |
| 4,107,892 A | 8/1978 | Bellem | |
| 4,113,399 A * | 9/1978 | Hansen, Sr. | 403/329 |
| 4,227,430 A | 10/1980 | Janssen et al. | |
| 4,299,070 A | 11/1981 | Oltmanns | |
| 4,426,820 A | 1/1984 | Terbrack | |
| 4,512,131 A | 4/1985 | Laramore | |
| 4,599,841 A | 7/1986 | Haid | |
| 4,648,165 A | 3/1987 | Whitehorne | |
| 5,007,222 A | 4/1991 | Raymond | |
| 5,148,850 A | 9/1992 | Urbanick | |
| 5,182,892 A | 2/1993 | Chase | |
| 5,247,773 A | 9/1993 | Weir | |
| 5,344,700 A | 9/1994 | McGath et al. | |
| 5,348,778 A | 9/1994 | Knipp et al. | |
| 5,465,546 A | 11/1995 | Buse | |
| 5,548,937 A | 8/1996 | Shimonohara | |
| 5,598,682 A * | 2/1997 | Haughian | 52/745.21 |
| 5,618,602 A | 4/1997 | Nelson | |
| 5,634,309 A | 6/1997 | Polen | |
| 5,694,730 A | 12/1997 | Del Rincon et al. | |
| 5,755,068 A | 5/1998 | Ormiston | |
| 5,899,038 A | 5/1999 | Stropiana | |
| 5,950,389 A | 9/1999 | Porter | |
| 6,006,486 A | 12/1999 | Moriau | |
| 6,052,960 A | 4/2000 | Yonemura | |
| 6,065,262 A | 5/2000 | Motta | |
| 6,173,548 B1 | 1/2001 | Hamar et al. | |
| 6,182,410 B1 | 2/2001 | Pervan | |
| 6,216,409 B1 | 4/2001 | Roy et al. | |
| 6,314,701 B1 | 11/2001 | Meyerson | |
| 6,363,677 B1 | 4/2002 | Chen et al. | |
| 6,385,936 B1 | 5/2002 | Schneider | |
| 6,418,683 B1 | 7/2002 | Martensson et al. | |
| 6,446,413 B1 | 9/2002 | Gruber | |
| 6,490,836 B1 | 12/2002 | Moriau et al. | |
| 6,505,452 B1 | 1/2003 | Hannig | |
| 6,553,724 B1 | 4/2003 | Bigler | |
| 6,591,568 B1 | 7/2003 | Pålsson | |
| 6,601,359 B2 | 8/2003 | Olofsson | |
| 6,617,009 B1 | 9/2003 | Chen et al. | |
| 6,647,689 B2 | 11/2003 | Pletzer | |
| 6,647,690 B1 | 11/2003 | Martensson | |
| 6,763,643 B1 | 7/2004 | Martensson | |
| 6,769,219 B2 | 8/2004 | Schwitte et al. | |
| 6,804,926 B1 | 10/2004 | Eisermann | |
| 6,854,235 B2 | 2/2005 | Martensson | |
| 6,865,855 B2 | 3/2005 | Knauseder | |
| 6,874,291 B1 | 4/2005 | Weber | |
| 6,880,307 B2 | 4/2005 | Schwitte et al. | |
| 7,040,068 B2 | 5/2006 | Moriau et al. | |
| 7,051,486 B2 | 5/2006 | Pervan | |
| 7,152,383 B1 | 12/2006 | Wilkinson et al. | |
| 7,251,916 B2 | 8/2007 | Konzelmann et al. | |
| 7,377,081 B2 | 5/2008 | Ruhdorfer | |
| 7,454,875 B2 | 11/2008 | Pervan et al. | |
| 7,533,500 B2 | 5/2009 | Morton et al. | |
| 7,568,322 B2 | 8/2009 | Pervan | |
| 7,584,583 B2 | 9/2009 | Bergelin et al. | |
| 7,614,197 B2 | 11/2009 | Nelson | |
| 7,617,651 B2 | 11/2009 | Grafenauer | |
| 2002/0031646 A1 | 3/2002 | Chen et al. | |
| 2002/0170259 A1 | 11/2002 | Ferris | |
| 2002/0178674 A1 | 12/2002 | Pervan | |
| 2003/0009971 A1 | 1/2003 | Palmberg | |
| 2003/0024199 A1 | 2/2003 | Pervan et al. | |
| 2003/0037504 A1 | 2/2003 | Schwitte et al. | |
| 2003/0101681 A1 | 6/2003 | Tychsen | |
| 2003/0180091 A1 | 9/2003 | Stridsman | |
| 2003/0188504 A1 | 10/2003 | Ralf | |
| 2003/0196405 A1 | 10/2003 | Pervan | |
| 2004/0031227 A1 | 2/2004 | Knauseder | |
| 2004/0060255 A1 * | 4/2004 | Knauseder | 52/582.2 |
| 2004/0168392 A1 | 9/2004 | Konzelmann et al. | |
| 2004/0182036 A1 | 9/2004 | Sjoberg et al. | |
| 2004/0200175 A1 | 10/2004 | Weber | |
| 2004/0211143 A1 | 10/2004 | Hanning | |
| 2004/0261348 A1 | 12/2004 | Vulin | |
| 2005/0160694 A1 | 7/2005 | Pervan | |
| 2005/0210810 A1 | 9/2005 | Pervan | |
| 2006/0070333 A1 | 4/2006 | Pervan | |
| 2006/0101769 A1 | 5/2006 | Pervan et al. | |
| 2006/0236642 A1 | 10/2006 | Pervan | |
| 2006/0260254 A1 | 11/2006 | Pervan | |
| 2007/0028547 A1 | 2/2007 | Grafenauer | |
| 2007/0151189 A1 | 7/2007 | Yang | |
| 2007/0193178 A1 | 8/2007 | Groeke et al. | |
| 2008/0010931 A1 | 1/2008 | Pervan et al. | |
| 2008/0010937 A1 | 1/2008 | Pervan et al. | |
| 2008/0028707 A1 | 2/2008 | Pervan | |
| 2008/0034708 A1 | 2/2008 | Pervan | |
| 2008/0041008 A1 | 2/2008 | Pervan | |
| 2008/0066415 A1 | 3/2008 | Pervan | |
| 2008/0104921 A1 | 5/2008 | Pervan et al. | |
| 2008/0110125 A1 | 5/2008 | Pervan | |
| 2008/0134607 A1 | 6/2008 | Pervan et al. | |
| 2008/0134613 A1 | 6/2008 | Pervan | |
| 2008/0134614 A1 | 6/2008 | Pervan et al. | |
| 2008/0155930 A1 | 7/2008 | Pervan et al. | |
| 2008/0172971 A1 | 7/2008 | Pervan | |
| 2008/0216434 A1 | 9/2008 | Pervan | |
| 2008/0216920 A1 | 9/2008 | Pervan | |

FOREIGN PATENT DOCUMENTS

| | | |
|---|---|---|
| DE | 199 40 837 A1 | 11/2000 |
| DE | 199 58 225 A1 | 6/2001 |
| DE | 202 05 774 U1 | 8/2002 |
| DE | 203 20 799 U1 | 5/2005 |
| EP | 0 013 852 A1 | 8/1980 |
| EP | 1 308 577 A2 | 5/2003 |
| EP | 0 974 713 A1 | 12/2005 |
| FR | 1.138.595 | 6/1957 |
| FR | 2 256 807 | 8/1975 |
| GB | 240629 | 10/1925 |
| GB | 1171337 | 11/1969 |
| GB | 2 051 916 A | 1/1981 |
| JP | 3-110258 A | 5/1991 |
| JP | 05-018028 A | 1/1993 |
| WO | WO 97/47834 A1 | 12/1997 |
| WO | WO 00/47841 A1 | 8/2000 |
| WO | WO 01/02669 A1 | 1/2001 |
| WO | WO 01/02672 A1 | 1/2001 |
| WO | WO 01/66877 A1 | 9/2001 |
| WO | WO 03/016654 A1 | 2/2003 |
| WO | WO03/083234 A1 * | 10/2003 |
| WO | WO 03/087497 A1 | 10/2003 |
| WO | WO 2004/020764 A1 | 3/2004 |
| WO | WO 2004/079130 A1 | 9/2004 |
| WO | WO 2004/083557 A1 | 9/2004 |

WO WO 2004/085765 A1 10/2004

OTHER PUBLICATIONS

Pervan, et al., U.S. Appl. No. 12/216,892, entitled "Mechanical Locking of Floor Panels With a Flexible Tongue," Jul. 11, 2006.

Boo, et al., U.S. Appl. No. 12/362,977, entitled "Mechanical Locking of Floor Panels," Jan. 30, 2009.

Complaint, *Akzenta Paneele + Profile GmbH and W. Classen GmbH & Co. KG v. Brown-West L.L.C d/b/a Carpet One Floor & Home, Shaw Industries Group, Inc. and Valinge Innovation AB*, United States District Court for the Eastern District of Texas, Marshall Division, Case No. 2:10-CV-16, dated Jan. 14, 2010.

Answer, *Affirmative Defenses and Counterclaims of Defendant Valinge Innovation AB, Akzenta Paneele + Profile GmbH and W. Classen GmbH & Co. KG v. Brown-West L.L.C d/b/a Carpet One Floor & Home, Shaw Industries Group, Inc. and Valinge Innovation AB*, United States District Court for the Eastern District of Texas, Marshall Division, Case No. 2:10-CV-00016 (TWG)(CE), dated Apr. 9, 2010.

U.S. Appl. No. 12/518,584, Pervan.

U.S. Appl. No. 61/294,217, Pervan.

Pervan, et al., U.S. Appl. No. 12/518,584, entitled, "Mechanical Locking of Floor Panels," filed in the U. S. Patent and Trademark Office on Jun. 10, 2009.

Pervan, U.S. Appl. No. 61/294,217, entitled, "Mechanical Locking System for Floor Panels," filed Jan. 12, 2010.

\* cited by examiner

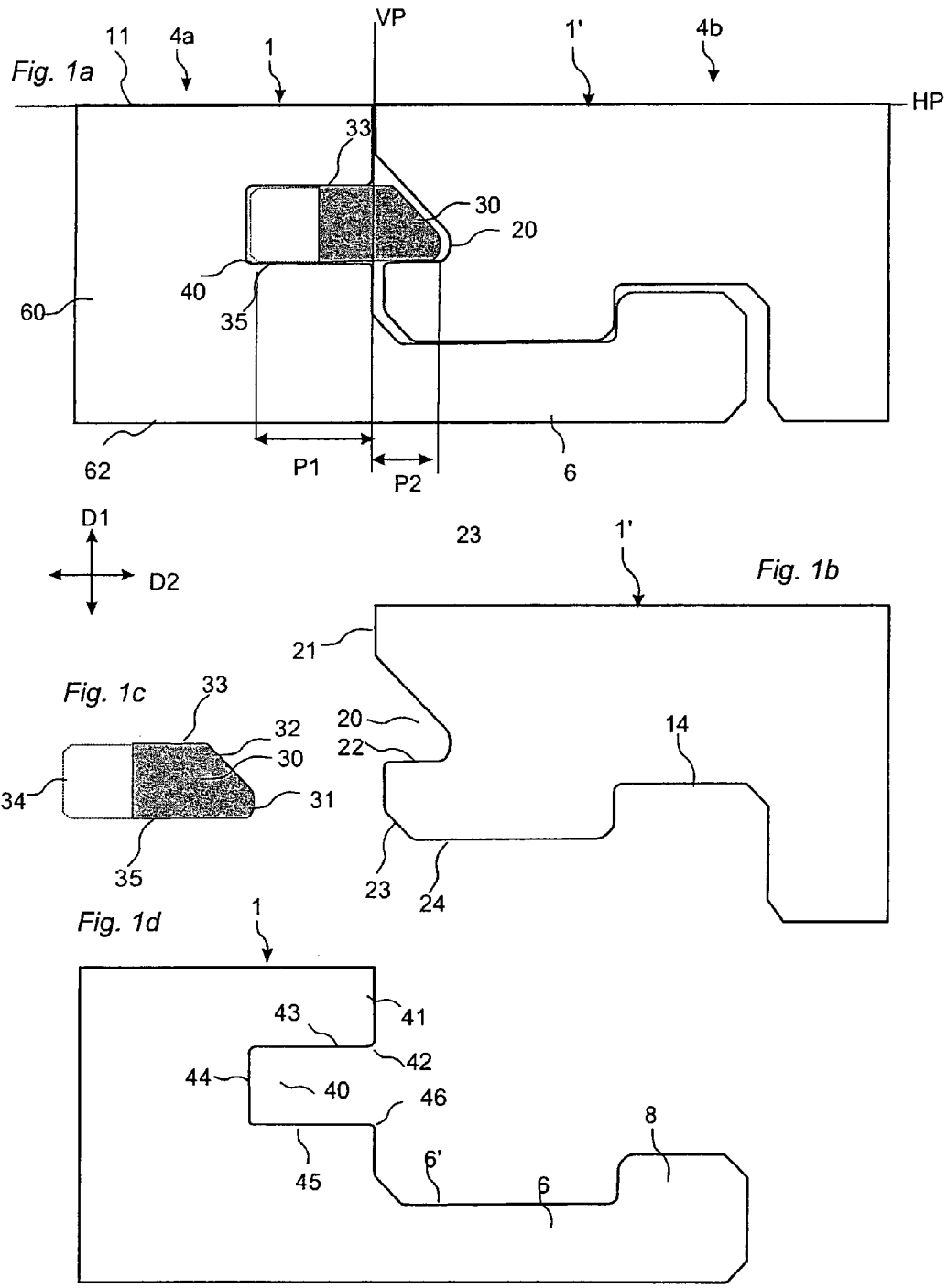

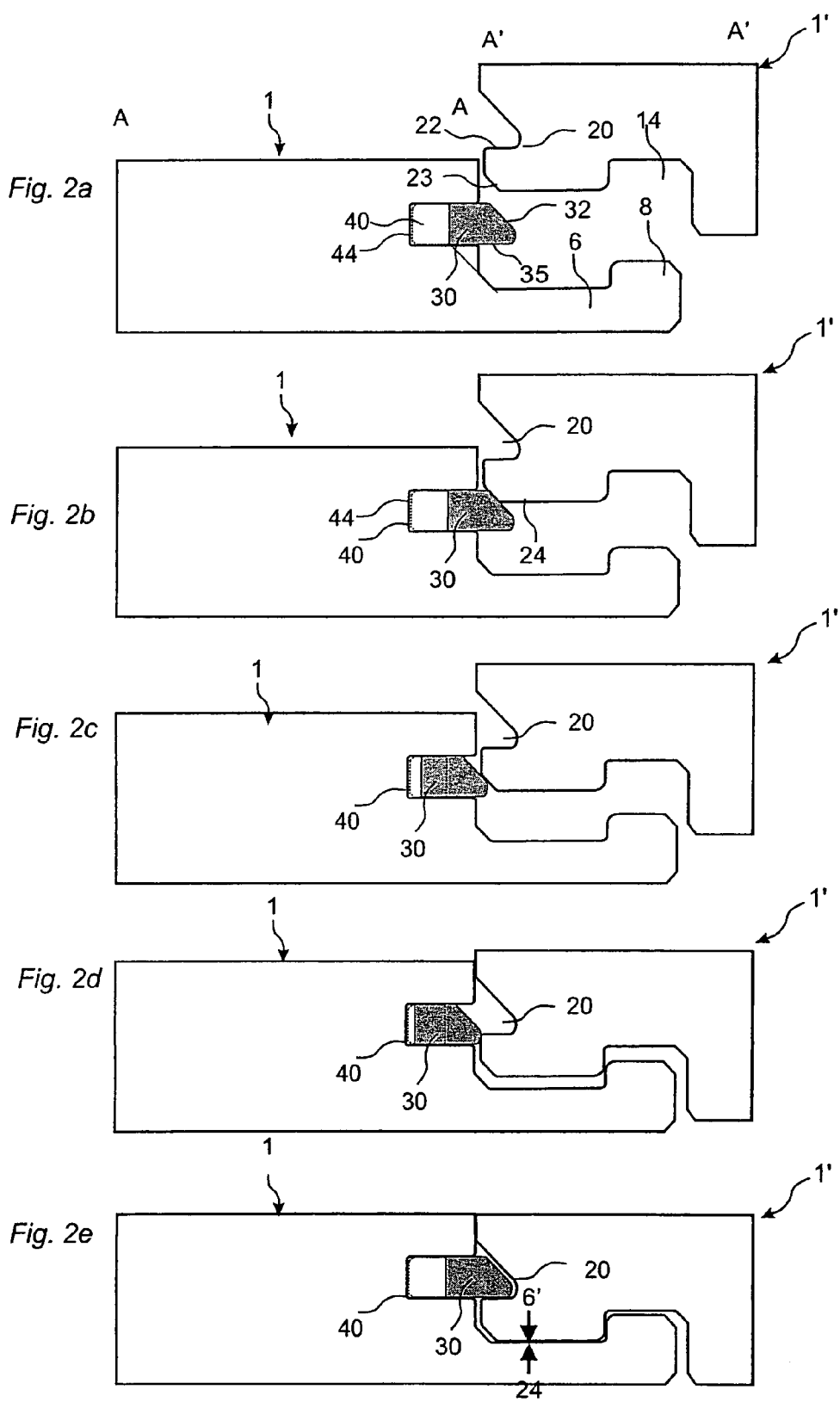

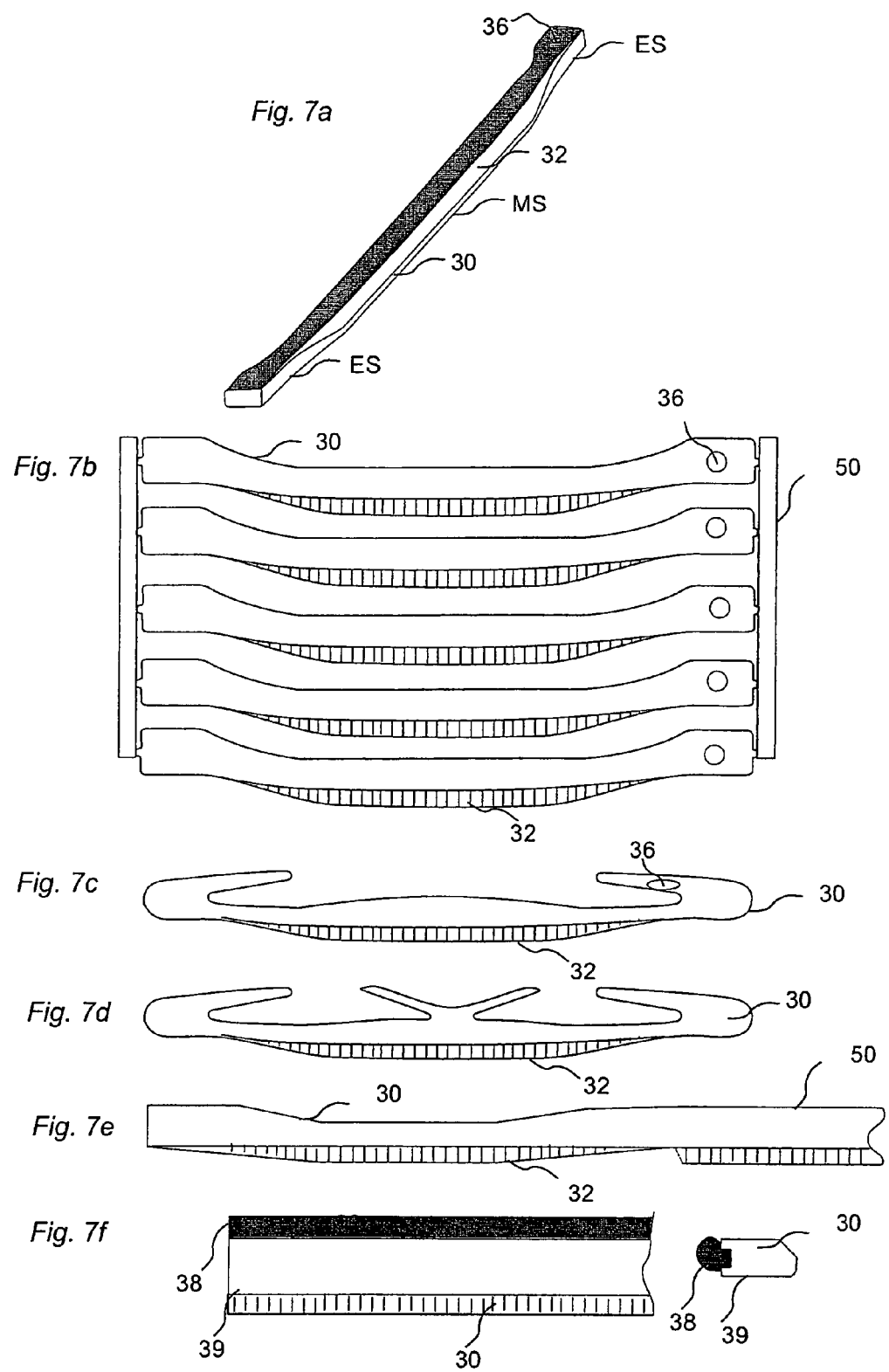

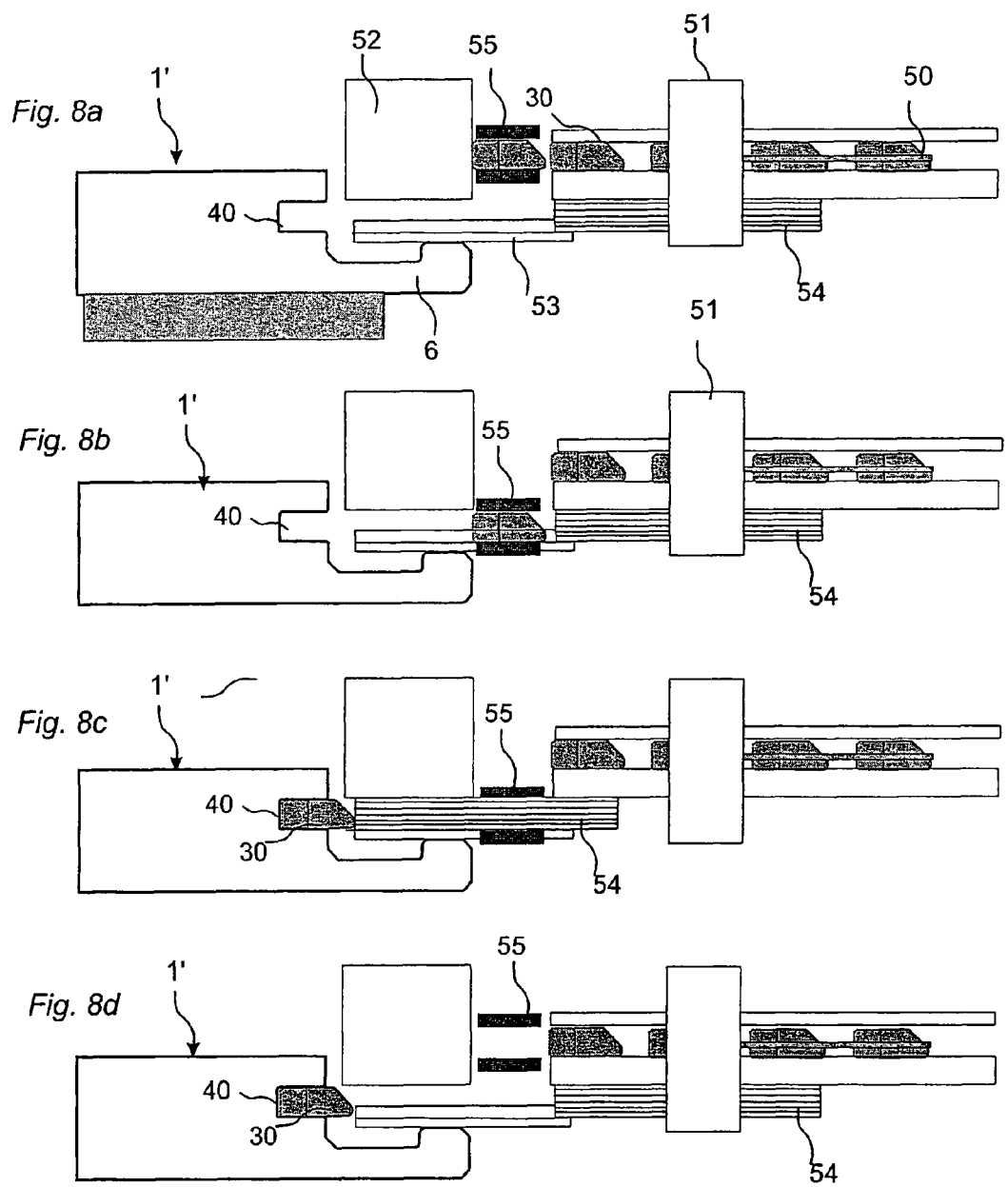

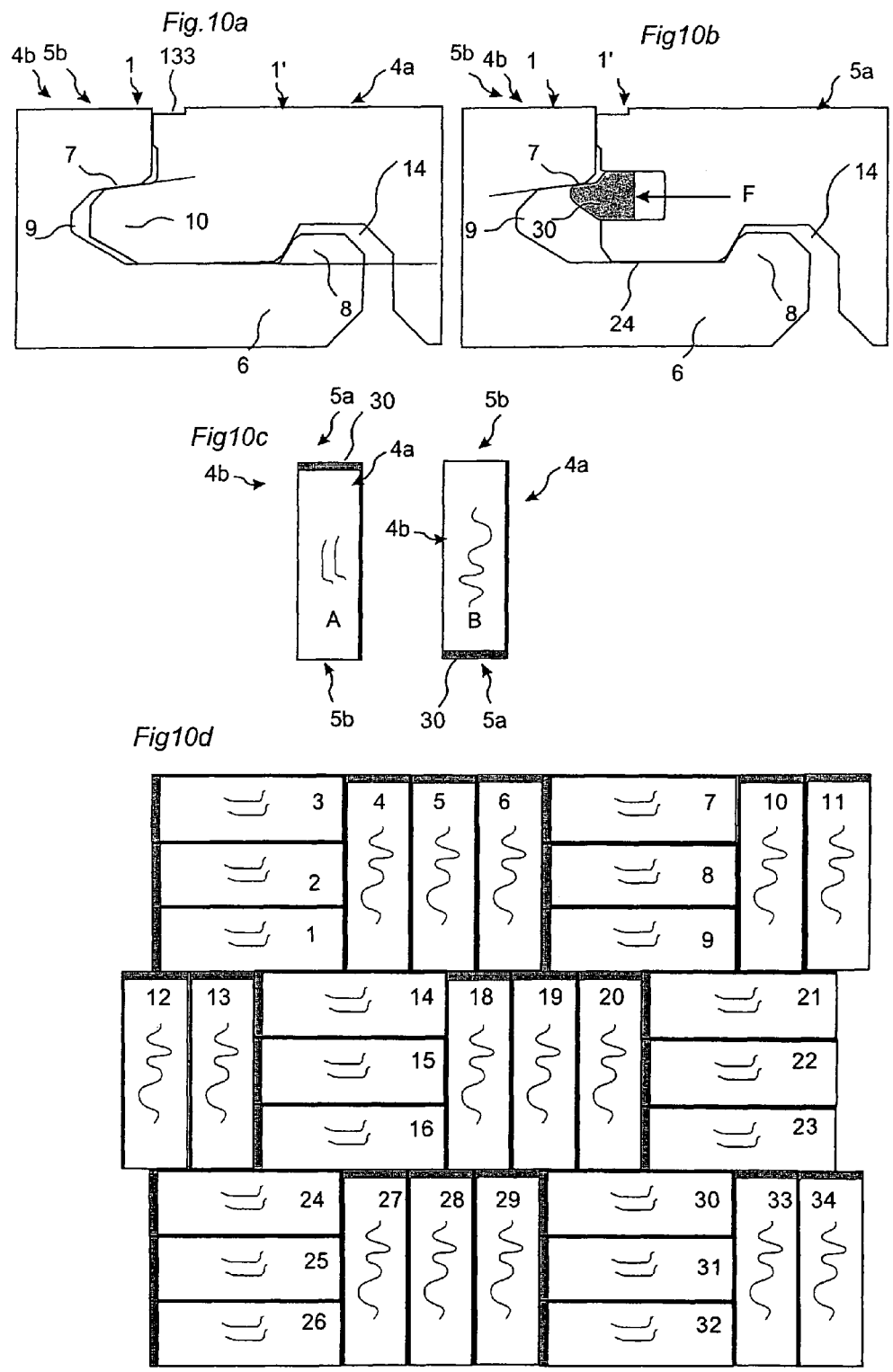

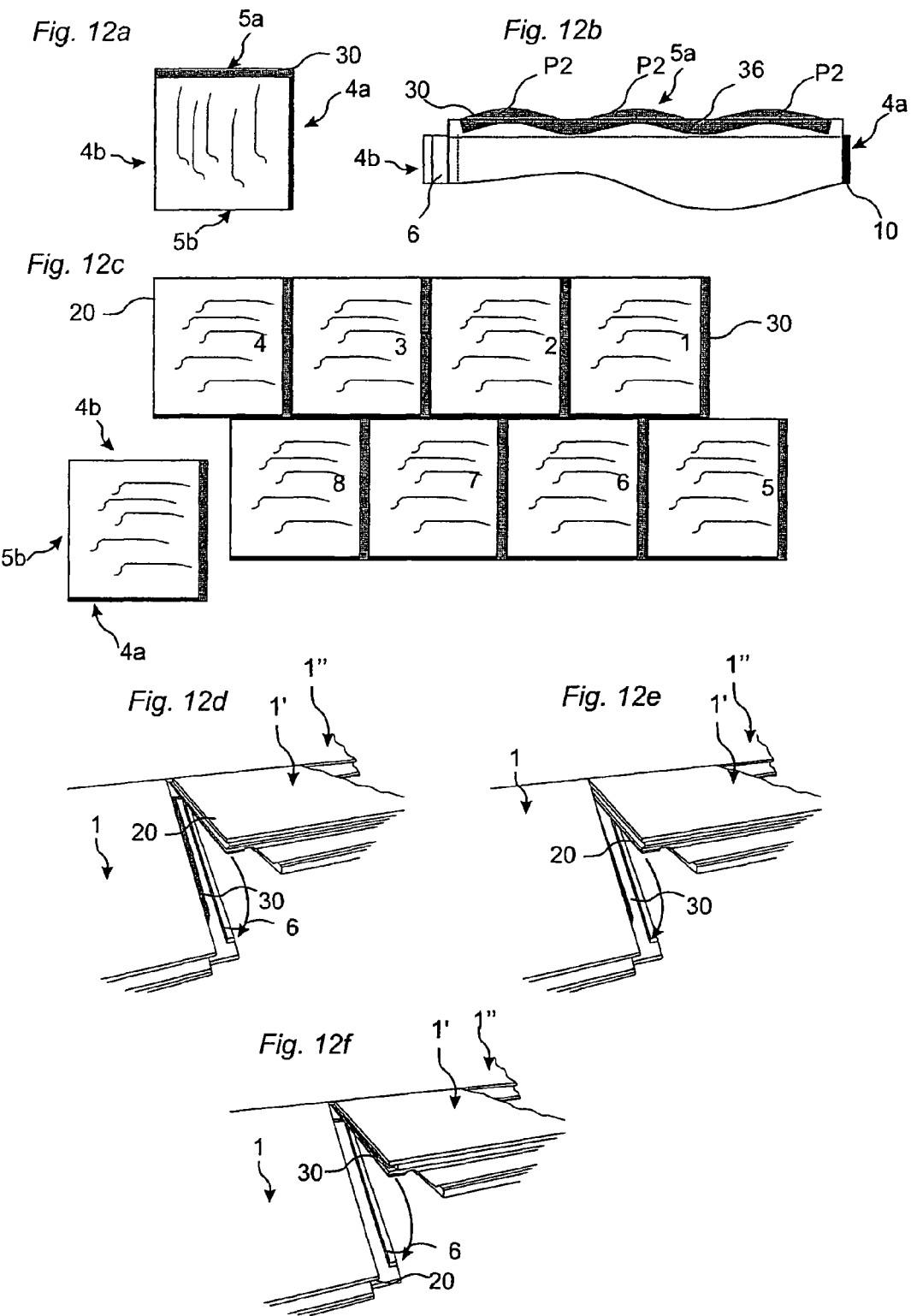

MECHANICAL LOCKING SYSTEM FOR FLOOR PANELS

TECHNICAL FIELD

The invention generally relates to the field of mechanical locking systems for floor panels and such building panels that are made of a board material. The invention relates to panels provided with such locking systems, elements for such locking systems and methods for making and installing panels with such locking systems.

FIELD OF APPLICATION OF THE INVENTION

The present invention is particularly suitable for use in floating floors, which are formed of floor panels which are joined mechanically with a locking system integrated with the floor panel, i.e. mounted at the factory, are made up of one or more upper layers of veneer, decorative laminate or decorative plastic material, an intermediate core of wood-fibre-based material or plastic material and preferably a lower balancing layer on the rear side of the core. The following description of prior-art technique, problems of known systems and objects and features of the invention will therefore, as a non-restrictive example, be aimed above all at this field of application and in particular laminate flooring formed as rectangular floor panels with long and shorts sides intended to be mechanically joined on both long and short sides. The long and shorts sides are mainly used to simplify the description of the invention. The panels could be square, the sides could have an angle other than 90 degree and they could have more than 4 sides. It should be emphasized that the invention can be used in any floor panel and it could be combined with all types of known locking system, where the floor panels are intended to be joined using a mechanical locking system in the horizontal and vertical directions. The invention can thus also be applicable to, for instance, solid wooden floors, parquet floors with a core of wood or wood-fibre-based material and a surface of wood or wood veneer and the like, floors with a printed and preferably also varnished surface, floors with a surface layer of plastic or cork, linoleum, rubber. Even floors with hard surfaces such as stone, tile and similar are included and floorings with soft wear layer, for instance needle felt glued to a board. The invention can also be used for joining building panels which preferably contain a board material for instance wall panels, ceilings, furniture components and similar.

BACKGROUND OF THE INVENTION

Laminate flooring usually consists of a core of a 6-12 mm fibre board, a 0.2-0.8 mm thick upper decorative surface layer of laminate and a 0.1-0.6 mm thick lower balancing layer of laminate, plastic, paper or like material. The surface layer provides appearance and durability to the floor panels. The core provides stability, and the balancing layer keeps the panel plane when the relative humidity (RH) varies during the year. The floor panels are laid floating, i.e. without gluing, on an existing sub floor. Laminate flooring and also many other floorings are made by the surface layer and the balancing layer being applied to a core material. This application may take place by gluing a previously manufactured decorative layer, for instance when the fibre board is provided with a decorative high pressure laminate which is made in a separate operation where a plurality of impregnated sheets of paper are compressed under high pressure and at a high temperature. The currently most common method when making laminate flooring, however, is direct laminating which is based on a more modern principle where both manufacture of the decorative laminate layer and the bonding to the fibre board take place in one and the same manufacturing step. Impregnated sheets of paper are applied directly to the panel and pressed together under pressure and heat without any gluing.

Traditional hard floor panels in floating flooring of this type are usually joined by means of glued tongue-and-groove joints.

In addition to such traditional floors, which are joined by means of glued tongue-and-groove joints, floor panels have recently been developed which do not require the use of glue and instead are joined mechanically by means of so-called mechanical locking systems. These systems comprise locking means which lock the panels horizontally and vertically. The mechanical locking systems are usually formed by machining of the core of the panel. Alternatively, parts of the locking system can be formed of a separate material, for instance aluminum or HDF, which is integrated with the floor panel, i.e. joined with the floor panel in connection with the manufacture thereof.

The main advantages of floating floors with mechanical locking systems are that they can easily and quickly be laid by various combinations of inward angling, snapping-in and insertion. They can also easily be taken up again and used once more at a different location. A further advantage of the mechanical locking systems is that the joint edges of the floor panels can be made of materials, which need not to have good gluing properties. The most common core material is fibre-board with high density and good stability usually called HDF—High Density Fibreboard. Sometimes also MDF—Medium Density Fibreboard—is used as core.

Definition of Some Terms

In the following text, the visible surface of the installed floor panel is called "front side", while the opposite side of the floor panel, facing the sub floor, is called "rear side". The edge between the front and rear side is called "joint edge". By "horizontal plane" is meant a plane which extends parallel to the outer part of the surface layer. Immediately juxtaposed upper parts of two adjacent joint edges of two joined floor panels together define a "vertical plane" perpendicular to the horizontal plane.

By "joint" or "locking system" are meant co acting connecting means which connect the floor panels vertically and/or horizontally. By "mechanical locking system" is meant that joining can take place without glue. Mechanical locking systems can in many cases also be joined by gluing. By "integated with" means formed in one piece with the panel or factory connected to the panel.

By a "flexible tongue" is meant a separate tongue which has a length direction along the joint edges and which is forming a part of the vertical locking system and could be displaced horizontally during locking. The tongue could be for example flexible and resilient in such a way that it can bend along its length and spring back to its initial position.

By "flexible tongue blank" are meant two or more flexible tongues which are connected to a one piece component. Examples of such flexible tongue blanks will be described in more detail below.

By "fixing the flexible tongue" is meant that the flexible tongue should at least be sufficiently attached to the floor panel so as not to incidentally fall off during handling of the floor panel, at the factory, during transport and/or in installation. By "mechanically fixed" is meant that the fixing is essentially due to shape or friction force.

By "angling" is meant a connection that occurs by a turning motion, during which an angular change occurs between two parts that are being connected, or disconnected. When angling relates to connection of two floor panels, the angular motion takes place with the upper parts of joint edges at least partly being in contact with each other, during at least part of the motion.

By "vertical folding" is meant a connection of three panels where a first and second panel are in a connected state and where an angling action connects two perpendicular edges of a new panel to the first and second panel. Such a connection takes place for example when a long side of first panel in a first row is already connected to a long side of a second panel in a second row. The third panel is than connected by angling to the long side of the first panel in the first row. This specific type of angling action, which also connects the short side of the new panel and second panel, is referred to as vertical folding Prior-Art Technique and Problems Thereof For mechanical joining of long sides as well as short sides in the vertical and horizontal direction (direction D1, D2) several methods are used but the locking is always performed in 3 steps where angling or snapping are combined with displacement along the joint edge in the locked position after an optional side has been joined.

Angling of long side, displacement and snapping-in of short side

Snapping-in of long side, displacement and snapping-in of short side.

Angling of short side, displacement of the new panel along the short side edge of the previous panel and finally downward angling of two panels.

These laying methods can also be combined with insertion along the joint edge.

It is known the locking system may, however, be formed so that snapping-in may occur by a motion which is vertical to the surface of the floor panel. Generally the long side is locked by angling and the short side with a vertical angling which locks with a snap action. Such a system in described in WO 01/0248127 (Akzenta) The connection of panels is complicated and difficult since fibres must be compressed and a hammer with a tapping block must be used. The panels are locked in vertical direction mainly by a friction force and the locking strength is low.

It is known that floor panels may be locked on long and short side vertically and horizontally with one simple vertical folding action (WO 03/083234 Applicant Valinge Aluminum). This document comprises a part of this application. The object of WO 03/083234 is to provide a joint system and floor panels which can be laid with a vertical folding.

A floor panel with a vertical joint in the form of a flexible tongue and a groove is provided, the tongue being made of a separate material and being flexible so that at least one of the sides of the floor panel can be joined by a vertical motion parallel to the vertical plane.

This document also show how a joint system can be made with a flexible spring tongue which can be displaced and/or compressed horizontally in and out or alternatively be bent vertically up or down. It describes a separate tongue of, for instance, wood fibre material, which can be displaced horizontally by means of a flexible material, for instance a rubber paste. It also describes an embodiment with a tongue, which has an inner part that is resilient.

This known technology with a tongue which during locking moves horizontally in relation to the adjacent edges offers several advantages over the known installation methods. The locking is easy and faster since 3 steps are reduced to one step.

The invention described in WO 03/083234 does not however show the best method to lock floor panels with a vertical folding. The production cost and the locking function could be improved considerably.

BRIEF DESCRIPTION AND OBJECTS THEREOF

A first overall objective of the present invention is to provide a locking system based on a vertical folding with a flexible tongue connected in a tongue groove. The locking system should make it possible to lock all four sides of one panel vertically and horizontally to other panels with an angling action only. The costs and functions should be favorable compared to the known technology. An essential part of the overall objective is to improve the function and costs of those parts of the locking system that causes the flexible tongue to displace during locking and spring back in locked position.

More specifically the object is to provide a vertical folding locking system with a flexible tongue where one or several of the following advantages are obtained.

The flexible tongue should preferably be possible to displacement during locking with such a low force that no tools will be needed in connection with installation.

The spring effect should be reliable and the flexible tongue should always move back to its pre-determined position when the panels have been brought to the position where they are to be locked.

The vertical locking should be strong and prevent that two locked panels will move vertically when humidity is changing or when people walk on a floor.

The locking system should be able to lock floor panels vertically with high precision so that the surfaces are essentially in the same plane.

The vertical locking system should be designed in such a way that the material and production costs could be low.

The separate flexible tongue should be possible to connect to the floor panel in a simple and cost effective way. The connection should keep the flexible tongue connected to the panel during production, transport and installation.

A second objective is to provide methods to produce the flexible tongue and flexible tongue blanks which are later to constitute parts of the mechanical locking system of the floor panels.

A third object is to provide a rational method for joining the flexible tongues with the joint portion of the floor panel to form an integrated mechanical locking system where the flexible tongue is factory connected to the floor panel.

A fourth object is to provide installation methods to connect floor panels with vertical folding.

The above objects of the invention are achieved wholly or partly by a locking system, floor panels, a flexible tongue, a flexible tongue blank and production and installation methods according to the independent claims. Embodiments of the invention are evident from the dependent claims and from the description and drawings.

Although it is an advantage to integrate the flexible tongue with the panel in the factory before installation, the invention does not exclude an embodiment in which flexible tongues are delivered as separate components to be connected to the panel by the installer prior to installation.

According to a first aspect of the invention, a new floor panel comprising connecting means which are integrated with the floor panel and adapted to connect the new floor panel with an essentially identical first and second floor panel is provided. The upper joint edges of said new and second floor panels define in the connected state a vertical plane. The connecting means are designed to connect said new floor panel with said second floor panel in a horizontal direction perpendicular to said vertical plane and in a vertical direction parallel to the vertical plane. The vertical connection comprising a flexible tongue in a sliding groove in one of the new or second floor panels. The sliding groove is formed in the edge of the panel and is open towards the vertical plane. The flexible tongue has a length direction along the joint edges, a width in the horizontal plane perpendicular to the length and a thickness in the vertical direction.

The flexible tongue is designed to cooperate, in said connected state with a tongue groove of another one of the new or second floor panels.

The horizontal connection comprising a locking strip which projects from said vertical plane and carries a locking element 8 in the second panel.

The locking strip 6 is designed to cooperate, in said connected state, with a downward open locking groove of the new floor panel. The new floor panel could be locked to the first and second floor panel with vertical folding. The flexible tongue is during the vertical folding displaced two times in the sliding groove. The first displacement is effected by the vertical folding of the new floor panel whereby at least a part of the flexible tongue is bent in the length direction and parallel with the width.

A second displacement of the flexible tongue towards its initial position is accomplished substantially by a spring effect caused by said bending of said flexible tongue.

According to a first aspect of the second objective a tongue blank is provided consisting of several flexible tongues connected to each other. This facilitated automatic handling of the tongues in connection with the fixing of the flexible tongues into the displacement groove.

According to a first aspect of the third objective a production method is provided to fix the flexible tongue in the displacement groove. The flexible tongue is separated from a tongue blank and displaced essentially parallel to its width or length into the displacement groove where it is fixed with a friction force.

According to a first aspect of the fourth objective installation methods are provided which make it possible to connect floor panels vertically and horizontally long side to short side with a simple angling motion.

The invention allows horizontal and vertical locking of all sides of floor panels with a simple angling of the long sides only. Therefore it is especially suited for use in floor panels which are difficult to displace in locked position for example because they are long, in panels where parts of the locking system is made of a material with high friction, such as wood and in locking systems which are produced with tight fit, without play or even with pretension. Especially panels with such pretension where the locking strip is bent in locked position and presses the panels together are very difficult to displace. A locking system-that allows a vertical folding according to the invention will decrease the installation time of such panels considerably.

The invention is also especially well suited for panels which are connected long side to short side and for panels which are wide for example with a width larger than 20 cm. Such panels are difficult to snap on short side and in most materials they must have a vertical locking to avoid height differences between the joint surfaces.

BRIEF DESCRIPTION OF THE DRAWINGS

FIGS. 1a-d illustrate one embodiment of a locking system according to the invention.

FIGS. 2a-e illustrate in different steps mechanical joining of a floor panels according to an embodiment of the invention.

FIGS. 7a-f show different embodiments of a flexible tongue.

FIGS. 8a-8d show schematically how a separate flexible tongue could be connected to a floor panel.

FIGS. 10a-d show how two types of panels could be locked vertically and horizontally long side to short side with a simple angling action only.

FIGS. 12a-f show square panels and alternative locking methods.

DESCRIPTION OF EMBODIMENTS OF THE INVENTION

Figure 3A:
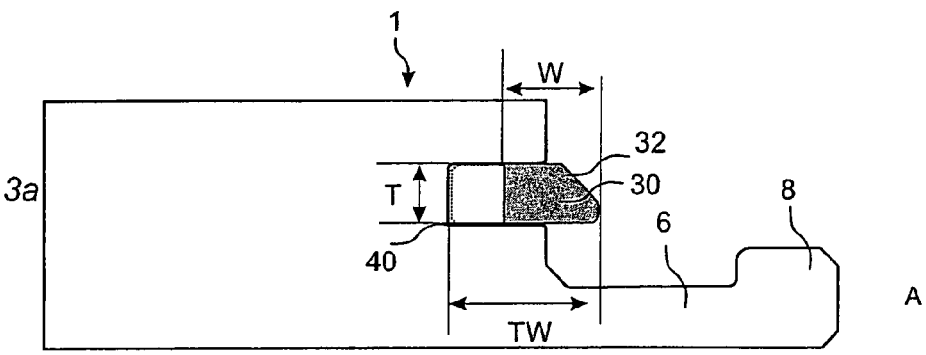
FIGS. 3a-b show floor panels with a mechanical locking system on a short side.

A first preferred embodiment of a floor panel 1, 1' provided with a mechanical locking system according to the invention is now described with reference to FIGS. 1a-1d. To facilitate understanding, the locking systems in all figures are shown schematically. It should be emphasized that improved or different functions can be achieved using combinations of the preferred embodiments. The inventor has tested all known and especially all commercially used locking systems on the market in all type of floor panels, especially laminate and wood floorings and the conclusion is that at least all these known locking systems which have one or more tongues could be adjusted to a system with one ore more flexible tongues according to the invention. Most of them could easily be adjusted in such a way that they will be compatible with the present systems. Several flexible tongues could be located in both adjacent edges, one over the other and they could be on different levels in the same edge or installed in the same groove after each other. The flexible tongue could be on long and/or short sides and one side with a flexible tongue could be combined with an other side which could have all known locking systems, preferably locking systems which could be locked by angling or a vertical movement. The invention does not exclude floor panels with flexible tongues on for example a long and a short side. Such panels could be installed by a vertical motion without any angling. Angles, dimensions, rounded parts etc are only examples and could be adjusted within the principles of the invention.

A first preferred embodiment of a floor panel 1, 1' provided with a mechanical locking system according to the invention is now described with reference to FIGS. 1a-1d.

FIG. 1a illustrates schematically a cross-section of a joint between a short side joint edge 4a of a panel 1 and an opposite short side joint edge 4b of a second panel 1'.

The front sides 61 of the panels are essentially positioned in a common horizontal plane HP, and the upper parts 21, 41 of the joint edges 4a, 4b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have in a manner known per se a locking strip 6 with a locking element 8 in one joint edge, hereafter referred to as the "strip panel" which cooperates with a locking groove 14 in the other joint edge, hereafter referred to as the "fold panel", and provides the horizontal locking.

The mechanical locking system according to the invention comprises a separate flexible tongue 30 connected into a displacement groove 40 formed in one of the joint edges. The flexible tongue 30 has a groove portion P1 which is located in the displacement groove 40 and a projecting portion P2 projecting outside the displacement groove 40. The projecting portion P2 of the flexible tongue 30 in one of the joint edges cooperates with a tongue groove formed in the other joint edge.

In this embodiment, the panel 1 could for example have a body or core 60 of wood-fibre-based material such as HDF, plywood or solid wood.

The flexible tongue 30 has a protruding part P2 with a rounded outer part 31 and a sliding surface 32 which in this embodiment if formed like a bevel. It has upper 33 and lower 35 tongue displacement surfaces and an inner part 34.

The displacement groove 40 has an upper 42 and lower 46 opening which in this embodiment are rounded, a bottom 44 and upper 43 and lower 45 groove displacement surfaces which preferably are essentially parallel with the horizontal plane HP.

The tongue groove 20 has a tongue locking surface 22 which cooperates with the flexible tongue 30 and locks the joint edges in a vertical direction D1. The fold panel 1' has a vertical locking surface 24, which is closer to the rear side 62 than the tongue groove 20. The vertical locking surface 24 cooperates with the strip 6 and locks the joint edges in an other vertical direction. The fold panel has in this embodiment a sliding surface 23 which cooperated during locking with the sliding surface 32 of the tongue.

Figure 5A:
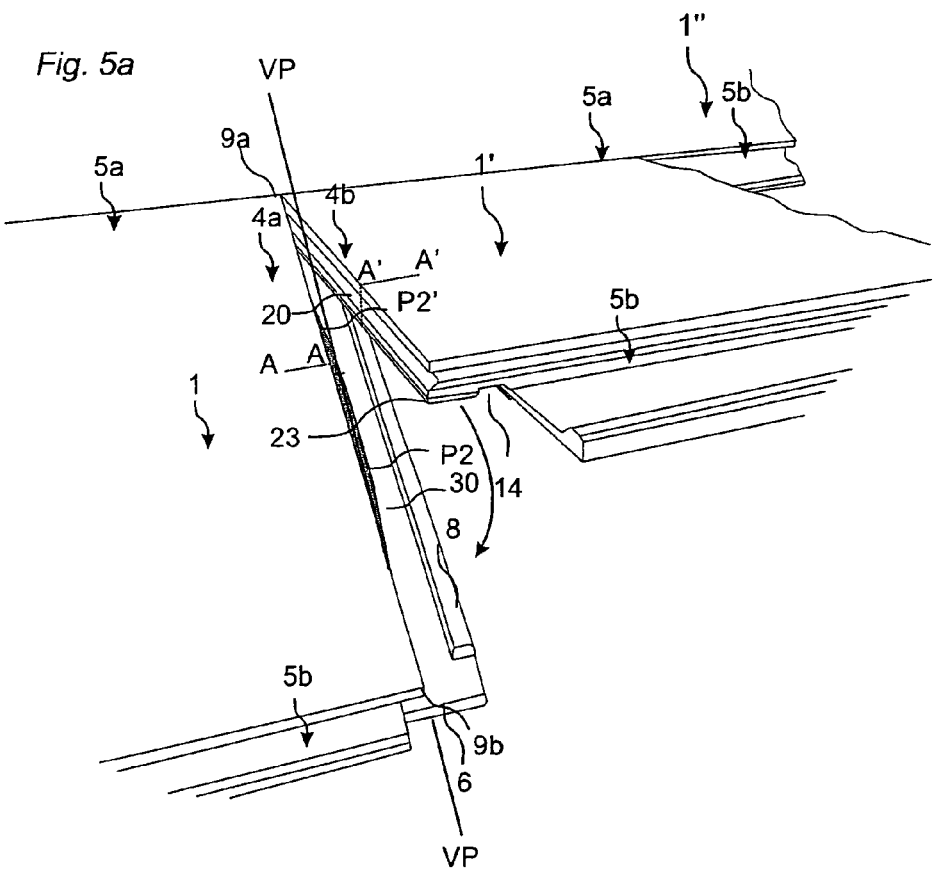
FIGS. 5a-b show how short sides of two floor panels could be locked with vertical folding.

FIGS. 2a-2e shows how a fold panel 1' could be locked to a strip panel 1. The figures show a vertical motion of two panels towards each other. The figures also shows a part of a vertical folding connecting three panels to each other as shown in FIG. 5a. The FIGS. 2a-2e shows how the two cross sections A-A and A'-A' of FIG. 5a will be connected when the fold panel 1' will be angled towards the strip panel 1. FIG. 2b-c show how the sliding surfaces cooperate when the folding panel 1' is moved vertically towards the strip panel 1. The flexible tongue 30 is displaced with a first displacement essentially horizontally in the displacement groove 40 towards the bottom 44. When the panels are in the position where they are to be locked to each other, the flexible tongue 30 springs back with a second displacement towards its initial position and the panels are locked vertically between the vertical locking surface 24 and the strip 6 and the lower displacement surface 35 and the tongue locking surface 22.

The flexible tongue 30 should preferably be connected to the displacement groove 40 with high precision. Depending on the compressibility and friction between the flexible tongue 30 and the displacement groove 40, the tongue as whole or different parts could be connected with a small play, for example 0.01-0.10 mm, a precise fit or a pre tension. Wax or other friction reducing materials or chemicals could be applied between the flexible tongue and the displacement groove and/or in the tongue groove and/or in the locking system in order to facilitate displacement of the tongue and the locking and/or to facilitate the connection of the flexible tongue in the displacement groove.

Even with a play, a precise fit between the upper joint edges could be accomplished. The lower tongue displacement surface 35 could be formed to press the tongue locking surface 22 and the vertical locking surface 24 towards the strip 6. For example the protruding part P2 of the tongue displacement surface 35 could be formed with a small angle to the horizontal plane HP. The protruding part P2 of the flexible tongue will tilt towards the front side 61 and a part of the upper tongue displacement surface 33 will press against the upper groove displacement surface 43 while parts of lower displacement surfaces 35,45 close to the bottom 44 of the displacement groove 40 will press against each other. In such an embodiment, the vertical fit between the upper joint edges will mainly depend on the production tolerances between the vertical locking surfaces 24 and an vertical contact surface 6', in this embodiment located on the upper part of the strip 6, which in locked position will be in contact with each other and preferably press against each other. The flexible tongue 30 could be formed to cause a permanent pressure force horizontally in the locked position. This means that the flexible tongue 30 will only partly spring back to the initial position. The flexible tongue 30 could optionally be designed with such dimensions that in locked position it will move slightly towards its initial position when people walk on the floor or when the panels at warping in different humidity. Gradually a perfect vertical connection will be accomplished.

Figure 3B:
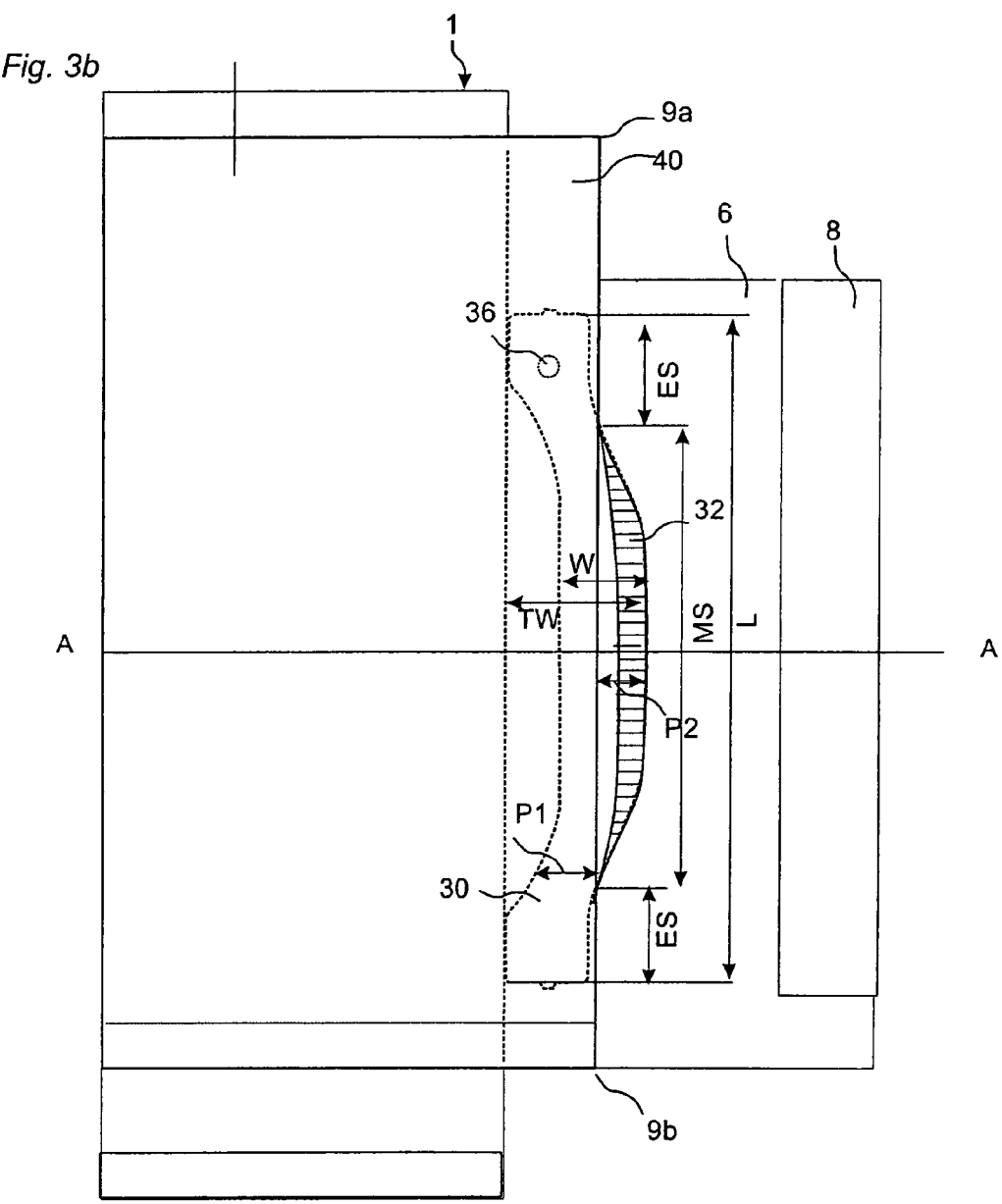

FIG. 3a shows a cross section A-A of a panel according to FIG. 3b seen from above. The flexible tongue 30 has a length L along the joint edge, a width W parallel to the horizontal plane and perpendicular to the length L and a thickness T in the vertical direction D1. The sum of the largest groove portion P1 and the largest protruding part P2 is the total width TW. The flexible tongue has also in this embodiment a middle section MS and two edge sections ES adjacent to the middle section. The size of the protruding part P2 and the groove portion P1 varies in this embodiment along the length L and the tongue is spaced from the two corner sections 9a and 9b. This shape is favorable in order to facilitate the first and the second displacement of the flexible tongue 30.

Figure 4A:
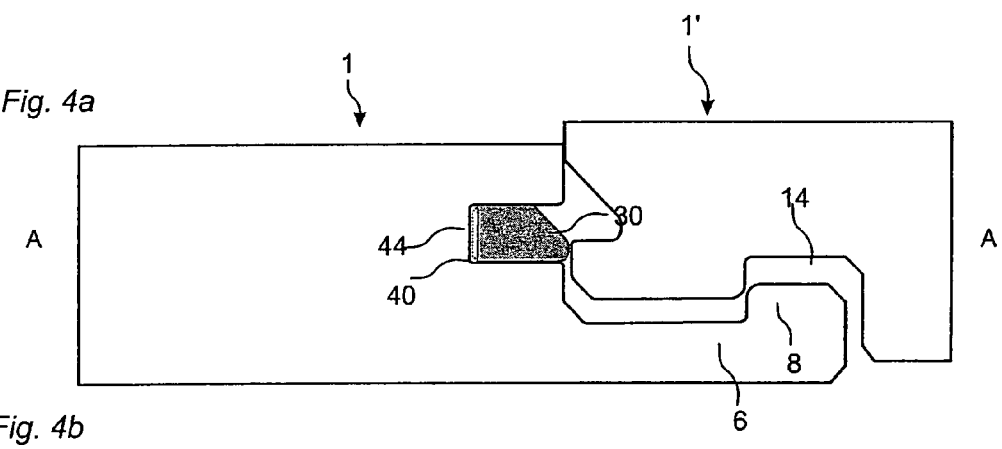
FIGS. 4a-b show the flexible tongue during the locking action.
Figure 4B:
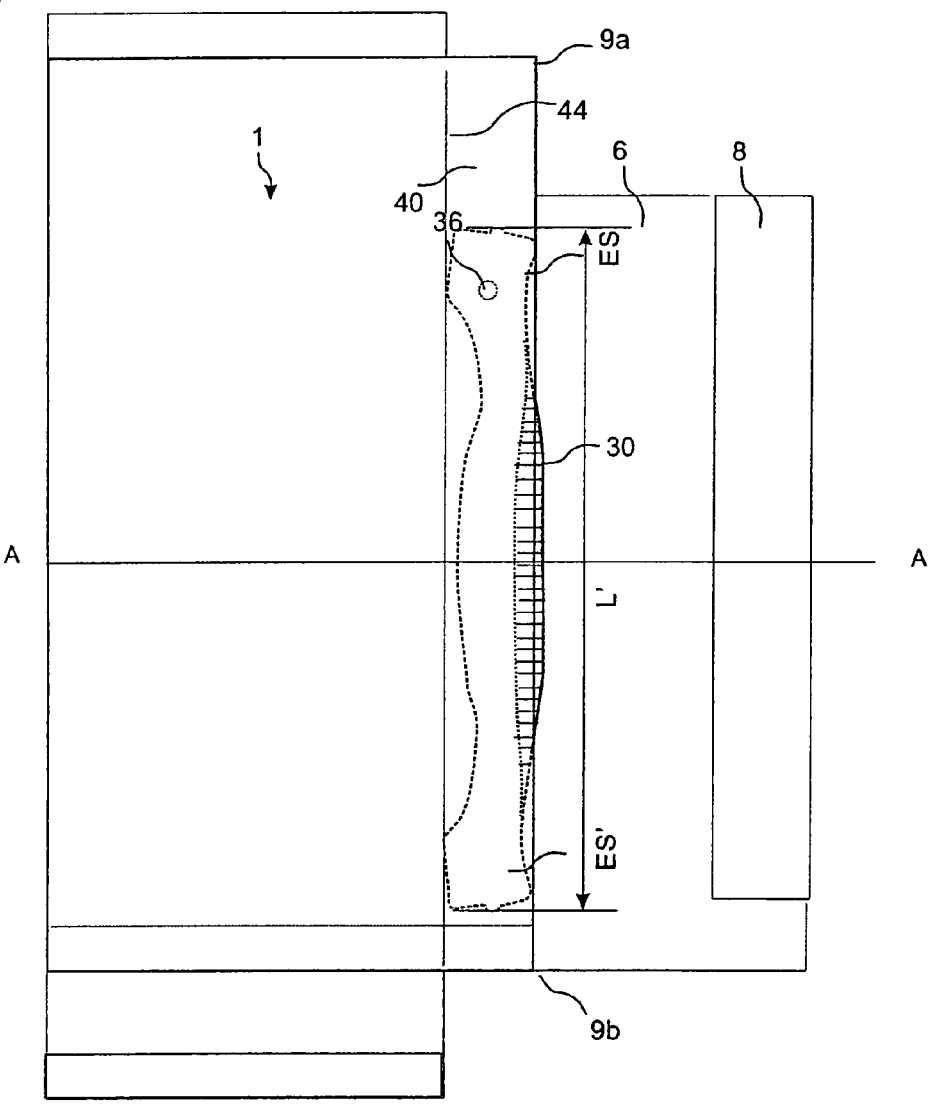

FIGS. 4a and 4b shows the position of the flexible tongue 30 after the first displacement towards the bottom 44 of the displacement groove 40. The displacement is caused essentially by bending of parts of the flexible tongue 30 in its length direction L parallel to the width W. This feature is essential for this embodiment of the invention and offers several advantages A first important advantage is that the tongue could be made of rather rigid material which is strong and stable in the vertical direction while at the same time a flexibility in horizontal direction D2 could be accomplished. The bending portions are could be made considerably larger than the horizontal displacement needed to accomplish the locking.

A second advantage is that the parts which are flexible and facilitates the first and second horizontal displacement also supports the vertical stability of the tongue. The advantage is that the total width TW of the flexible tongue and the depth of the displacement groove could be rather limited. This improves the strength and moisture deformation of the joint edge. As a non restrictive example it could be mentioned that the total width TW of the flexible tongue could be about 5-15 mm A third advantage is that the flexible tongue could be made in one piece of a single material without any soft and compressible materials. This will decrease the production cost and facilitate the connection of the tongue in the displacement groove.

The sliding grove is in this preferred embodiment a continuous groove over the whole length of the join edge. The displacement groove (40) could however be formed in only a part of the edge and it does not have to be parallel with the edge. The displacement groove (40) could for instance be curved. Such a groove is easy to produce with a rotating tool which could move against the edge.

The fold panel could be disconnected with a needle shaped tool which could be inserted from the corner section 9b into the tongue grove 20 and press the flexible tongue back into the displacement groove 40. The fold panel could than be angled up while the strip panel is still on the sub floor. Of course the panels could also be disconnected in the traditional way.

Figure 5B:
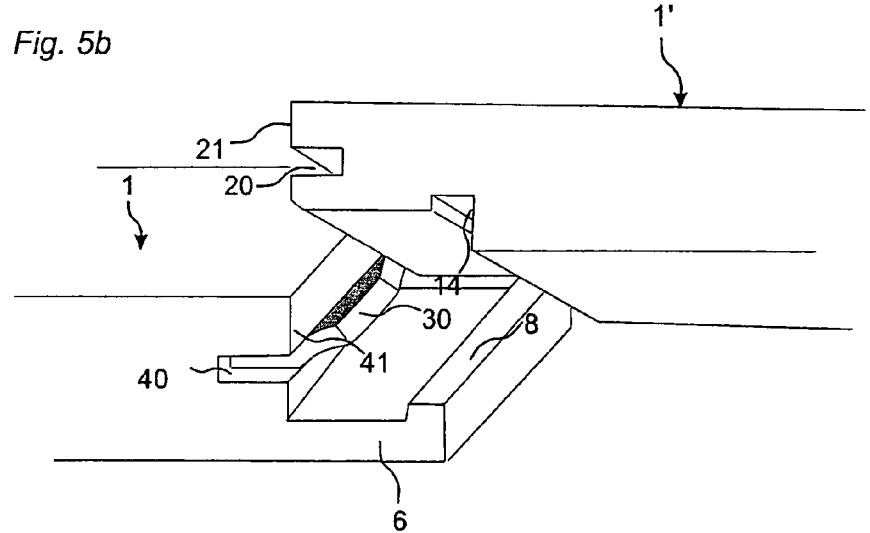

FIGS. 5a and 5b shows one embodiment of a vertical folding. A first panel 1" in a first row is connected to a second 1 panel in a second row. The new panel 1' is connected with its long side 5a to the long side 5b of the first panel with angling. This angling action also connects the short side 4b of the new pane with the short side 4a of the second panel. The fold panel 1' is locked to the strip panel 1 with a combined vertical and turning motion along the vertical plane VP. The protruding part P2 has a rounded and or angled folding part P2' which during folding cooperates with the sliding surface 23 of the folding panel 1'. The combined effect of a folding part P2', and a sliding surface 32 of the tongue which during the folding cooperates with the sliding surface 23 of the fold panel 1' facilitates considerably the first displacement of the flexible tongue 30. The horizontal pressing force could be spread over a much larger portion than the thickness T of the flexible tongue and the fold panel could easily be folded down with a low force even if the spring effect of the bending is high. As a non restrictive example it could be mentioned that a vertical pressing force of 10 N against a piece, which has a length of 100 mm along the long side, applied on the long side 5b of the fold panel, as shown in FIG. 5a, could displace a projecting portion P2 to the inner position even if the spring force is 20 N. Most of the pressure force will be horizontal and the flexible tongue will be displaced into the displacement groove 40 without any risk of a block effect caused by friction or a tilting and/or vertically bending of the flexible tongue 30. It is an advantage if the locking system is designed in such a way that the locking element 8 is partly in the locking groove 14 when the first displacement starts. This is shown in FIG. 5b. The top edges 41,21 are partly in contact with each other and the fold panel 1' is in the correct starting position. The locking element 8 and the locking groove 14 prevents the strip panel 1 and the fold panel 1' to separate when the flexible tongue 30 is pressed into the displacement groove 40. An essential feature of this embodiment is the position of the projecting portion P2 which is spaced from the corner section 9a and 9b. The spacing should be preferably at least 10% of the length of the joint edge, in this case the visible short side 4a. FIG. 5a shows that the spacing from the both corner section 9a and 9b gives the flexibility that the fold panel could during the vertical folding be connected to the long side of the first panel 1" with the tongue side 5a or the strip side 5b

Figure 6A:
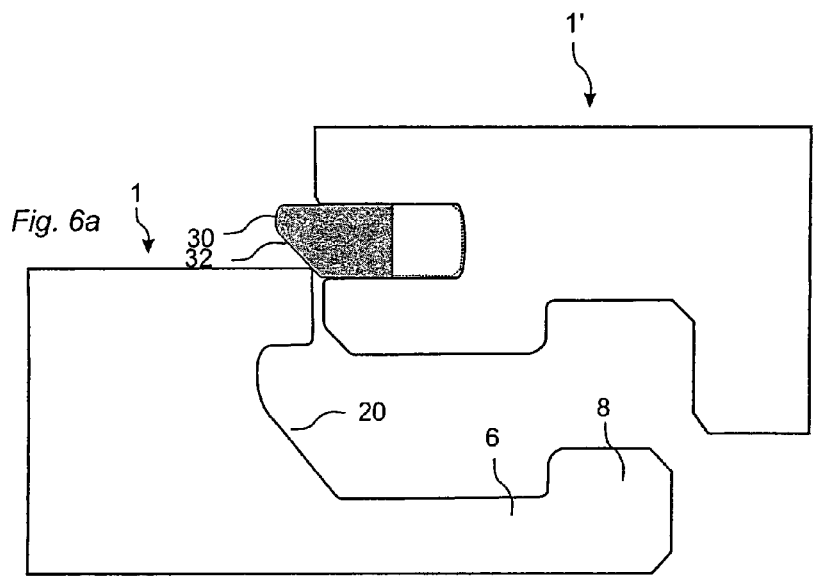
FIGS. 6a-c show another embodiment of the invention.
Figure 6B:
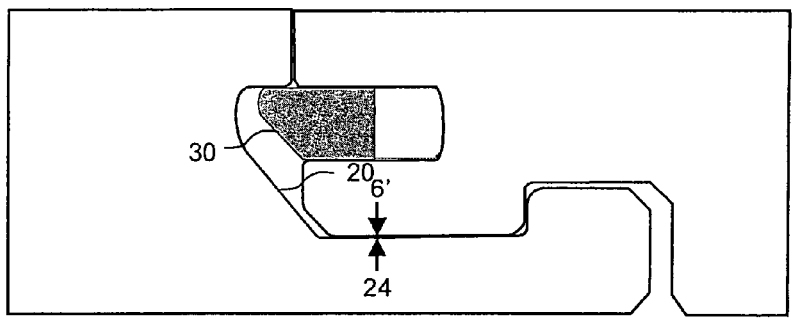

FIG. 6a-6b show that the flexible tongue could be in the edge of the fold panel 1'. The sliding surface 32 of the tongue cooperates in this embodiment with the top edge of the strip panel. Thanks to the folding part P2', the locking could be made without any risk of damaging the top surface layer at the edge. The advantage of this embodiment is that a short side with a flexible tongue could be connected to a traditional long side or short side locking system with a strip 6 and a tongue groove 20 in the same edge.

Figure 6C:
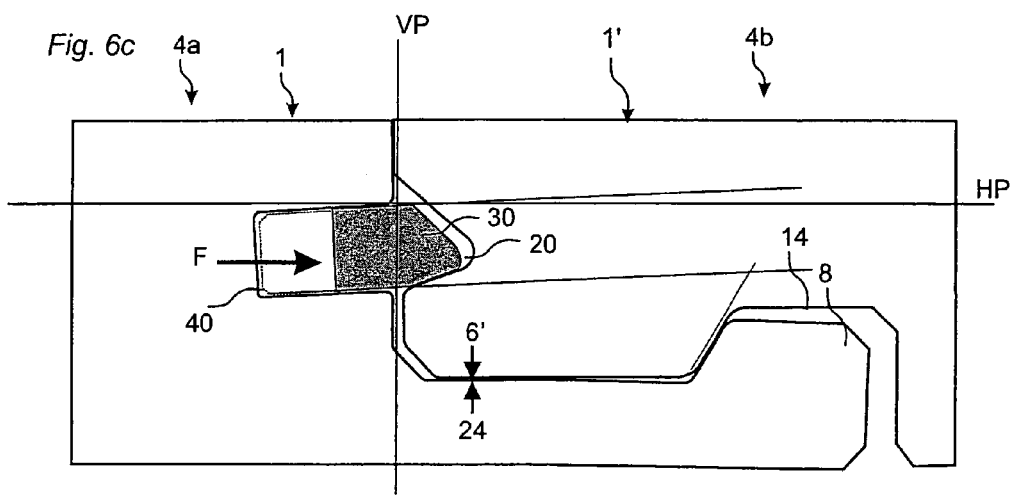

FIG. 6c shows an embodiment where the displacement groove 40 is not parallel with the horizontal plane HP. This facilitates the connection of the flexible tongue 30 into the displacement groove 40. The protruding part of the flexible tongue 30 is wedge shaped in order to press the vertical contact surface 6' and the vertical locking surface 24 against each other. The locking surfaces between the locking element 8 and the locking groove 14 are angled and have an angle which is less than 90 degree against the horizontal plane HP and the locking system could be connected with a tight fit and/or pre tension.

FIGS. 7a-7e shows different embodiments of the flexible tongue 30. In FIG. 7a the flexible tongue 30 has on one of the edge sections a friction connection 36 which could be shaped for instance as a local small vertical protrusion. This friction connection keeps the flexible tongue in the displacement groove 40 during installation, or during production, packaging and transport, if the flexible tongue is integrated with the floor panel at the factory. FIG. 4b show that the friction connection 36 keeps one edge section ES connected while the other edge section ES' moves along the edge. The length L' in the inner position is in this embodiment larger than the length L in locked position.

FIG. 7b shows a tongue blank 50 consisting of several flexible tongues 30 connected to each other. In this embodiment the flexible tongue 30 is made with moulding preferably injection moulding. Any type of polymer materials could be used such as PA (nylon), POM, PC, PP, PET or PE or similar having the properties described above in the different embodiments. These plastic materials could be reinforced with for instance glass fibre. A preferred material is glass fibre reinforced PA.

FIGS. 7c-e show different embodiments made by injection moulding. With this production method a wide variety of complex three-dimensional shapes could be produced at low cost and the flexible tongues 30 could easily be connected to each other to form tongue blanks 50. Of course the flexible tongue 30 could be made from metal. FIG. 7e shows that the flexible tongue could be made of an extruded or machined plastic section which could be further shaped with for example punching to form a flexible tongue according to the invention. Materials such as plastic, metals preferably aluminum, wood based sheet material such as HDf and compact laminate could be used.

FIG. 7f shows an embodiment which consist of two section 38 and 39 which are connected to each other. This will be explained more in connection to FIGS. 12d-f.

In general any shape which allows that a part of the tongue could bend in length direction and spring back in such a way that the projecting portion could be displaced with 0.1 mm or more, will be possible to use. Normally the displacement should be 1-3 mm but very small displacements of some 0.1 mm could be enough to form a vertical locking which prevent vertical movement especially in HDF material.

FIGS. 8a-8d show schematically a production method to fix the flexible tongue to the displacement groove. In this embodiment the flexible tongue is mechanically fixed. Of course glue or mechanical devices can also be used. To simplified the understanding the panel 1' is located with its front side up. The panel could also be turned with the rear side up. The tongue blanks 50 are moved trough a separation unit 51 which separates the flexible tongue 30 from the tongue blank 50. The flexible tongue 30 could than be moved to a lower level with a vertical device 55. This motion could also be combined with the separation. A pusher 54 moves the flexible tongue 30 into the displacement groove 40 and connects it with the friction connection 36. The flexible tongue is guided over the strip 6 between an upper 52 and lower 53 guiding devices. Vacuum could also be used to connect the flexible tongue 30 to the upper 52 guiding device during the horizontal displacement into the displacement groove 40. A lot of alternatives are possible within the main principles that the flexible tongue is separated from a tongue blank containing at least two connected flexible tongues and displaced essentially parallel to its width and/or length into the displacement groove 40 where it is fixed with a friction force.

Figure 9A:
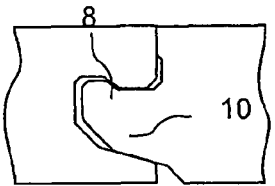
FIGS. 9a-f show schematically different embodiments according to the invention.
Figure 9B:
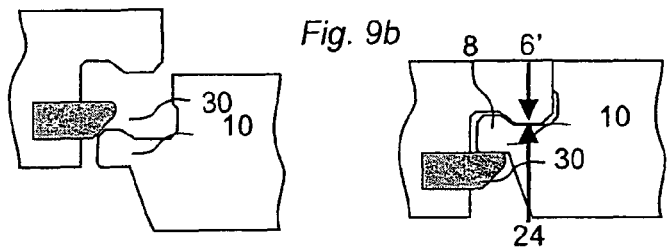
Figure 9C:
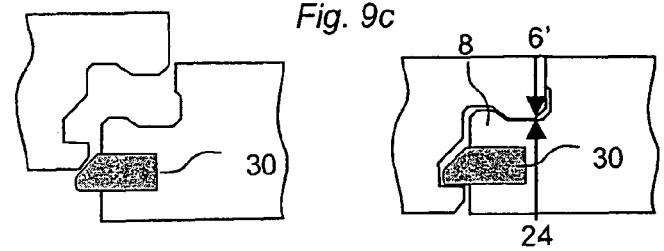
Figure 9D:
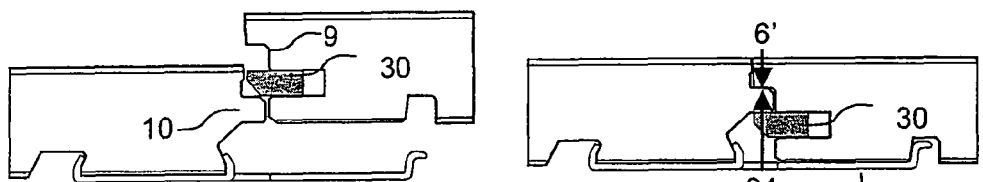
Figure 9E:
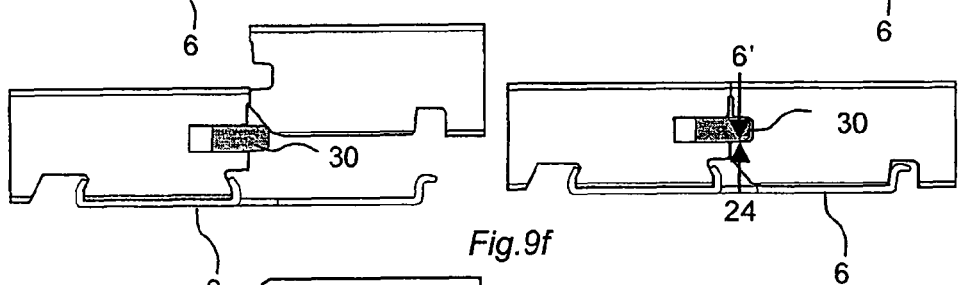
Figure 9F:
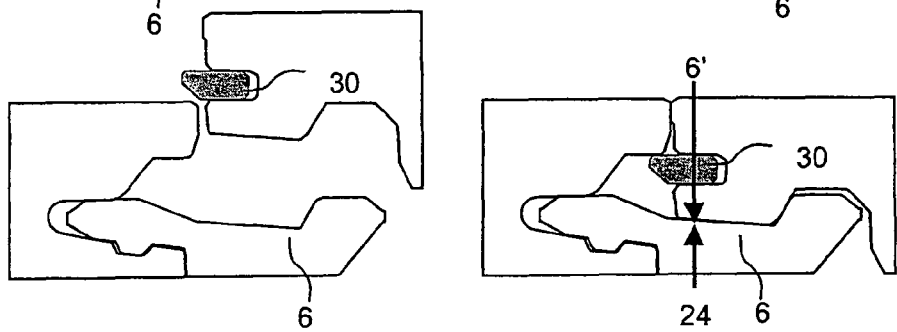
Figure 11A:
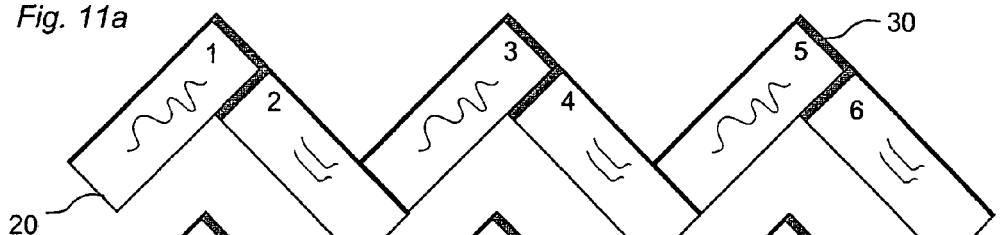
FIGS. 11a-d show another embodiment according to the principles in FIGS. 10a-d.
Figure 11B:
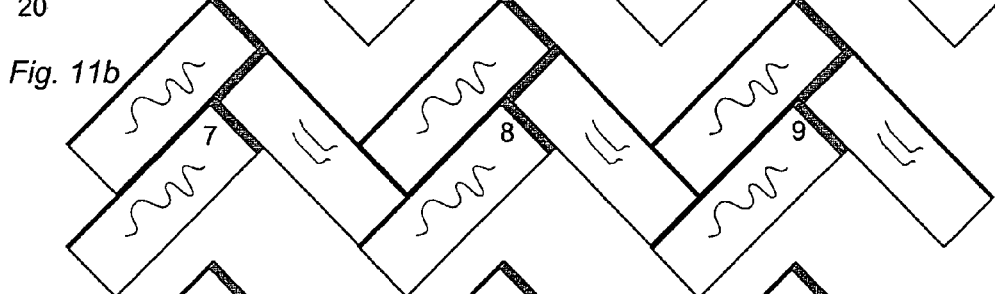
Figure 11C:
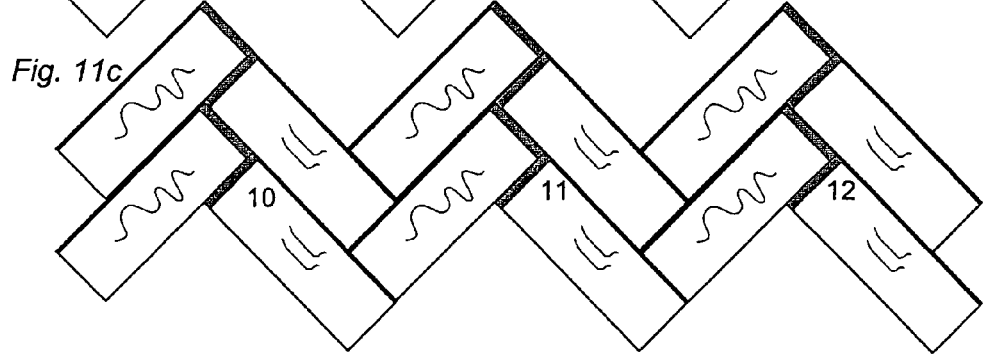
Figure 11D:
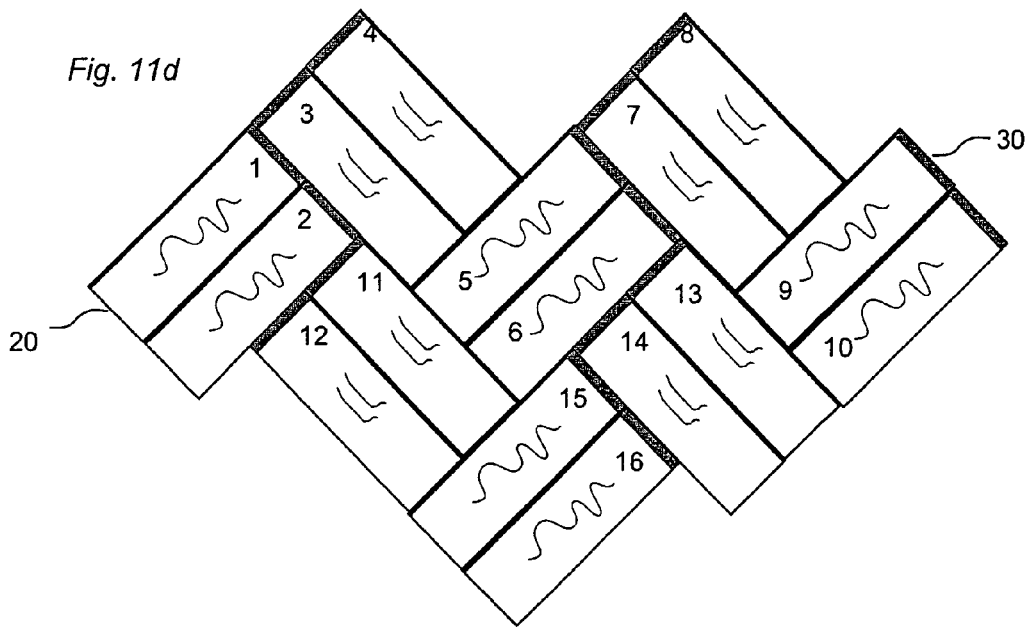

FIGS. 9a to 9f are examples which show that all known locking systems could be adjusted to vertical folding with a flexible tongue 30 according to the invention and that the flexible tongue 30 could be attached optionally to the strip or fold panel. In the embodiment of FIG. 9e, the strip 6 is not rigid enough to form a vertical contact surface. This could be solved by a tongue 10 and a groove 9 above the flexible tongue 3 30. Of course the vertical contact surface 6' could be a part of the tongue groove and the vertical locking surface 24 could be the projecting portion of the tongue as shown in FIG. 9e.

FIG. 10a-b shows how a locking system could be designed to lock long side 4a to long side 4b with angling, short side 5a to short side 5b by vertical folding and/or angling and short side to long side with vertical folding or angling. FIGS. 10c-10d show how two panels A and B with mirror inverted locking systems could be locked to a floor with an advanced installation pattern. Panels 1-6 could be installed with angling. Panel 7 could be installed by angling the short side to the long side of panel 6. Panels 8-9 could be installed by angling. Panel 12 is installed by angling the short side. Panels 13-23 are installed by folding. Panels 24-26 are installed by angling and panels 27-34 by folding. Thanks to the flexible tongue 30 on the short side the whole floor could be installed with a simple angling action in spite of the fact that all panels are connected on all sides vertically and horizontally and all panels are connected long to long side and long to short side. This installation method could be used in connection with all types of flexible tongues and not only those embodiment that bend along the length direction. FIG. 10b show that the locking system could be locked with a pressure force F caused by the flexible tongue 30.

FIGS. 11a-11d show how A and B panels with a flexible tongue could be installed and locked vertically D1 and horizontally D2 in a single or double herringbone pattern with only a simple angling action.

FIG. 12a-c shows vertical folding installation with square panels. The flexible tongue 30 has several protruding parts P2. This embodiment could be used as an alternative to several separate flexible tongues when the length of the joint edge exceed for example 200 mm. The friction connection 36 could be located for example in a middle section.

FIG. 12d-e shows an alternative way to displace the flexible tongue. The method could be combined with a flexible tongue according to FIG. 7f. The new panel 1' is in angled position with an upper part of the joint edge in contact with the first panel 1" in the first row. The first panel 1', the fold panel, is than displaced towards the second panel 1 until the edges are essentially in contact and a part of the flexible tongue 30 is pressed into the displacement groove 40 as can be seen in the FIG. 12e. The new panel 1' is than folded down towards the second panel 1. FIG. 12f show that the tongue could be on the folding panel. Since the displacement of the new panel 1' presses an edge section of the flexible tongue 30 into the displacement groove 40, vertical folding will be possible to make with less resistance. Such an installation could be made with a flexible tongue that has a straight protruding part. The flexible tongue 30 does not have to bend in the length direction if it has a flexible device such as rubber that could be compressed. The bending could be replaced by a horizontal turning action where one edge section of the flexible tongue during locking is closer to the bottom 44 of the displacement groove 40 than another opposite edge section.

Figure 13A:
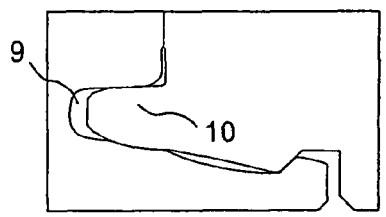
FIGS. 13a-c show how widely used traditional panels could be adjusted to vertical folding.
Figure 13B:
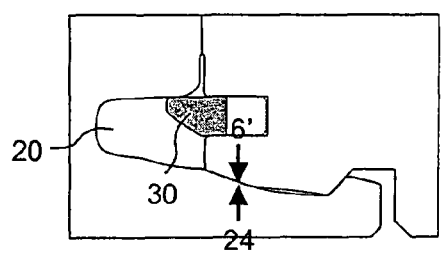
Figure 13C:
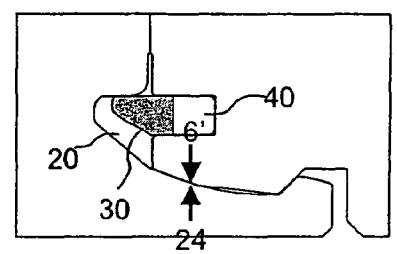

FIGS. 13a-c shows how a known locking system, used in large volumes on the marked, could be converted to a vertical folding, preferably in two steps. The first step is to replace the traditional tongue 10 with a flexible tongue 30. In this embodiment the locking systems will be compatible which means that an old and new panel could be locked to each other. After a while when all products in the shops are sold, the groove 9 of the strip part could be adjusted.

Within the invention a lot of alternatives are possible to accomplish vertical folding with a flexible tongue.

A flexible tongue could be produced according to the same principle as known mechanical devices which create a spring effect similar to locking devices used in doors, windows, furniture, cars and mobile phones. The flexible tongue with these mechanical devices could be formed with dimensions suitable for 6-15 mm floorings, especially wood floorings, and inserted into the edge. FIG. 13d shows that the flexible tongue (30) could for example be mounted in a separate sliding section 56 made of plastic or metal or any other suitable material and containing a compressible or flexible rubber, metal or plastic component (57) or similar able to create the spring effect. This sliding section 56 could be connected into the edge of the floor panel in a holding groove 40' which in this embodiment is rounded and has a shape similar to a part of a rotating saw blade. Since the holding groove 40' only is formed in a part of the short side edge, it could be made rather deep and the edge will still have sufficient strength. A preferable feature of this embodiment is that the deepest part of the holding groove 40' is only located in a part of the edge. Contrary to the other embodiments the holding groove 40' is not parallel with the joint edge and does not cover the whole edge. Of course other shapes are possible and the parallel groove is not excluded.

Especially on long and wide floor panels rather complicated devices could be used since only 2-4 pieces are required per m2 of flooring. Even with a rather high unit price, the advantages with vertical folding are considerable and could overcome a rather high cost for the locking system. Due to the fact that the short sides are not sawn very often, metal components could also be used and these components could be formed in such a way that they are easy to remove from the floor panel if the short side edge must be sawn.

In floor panels with a width of about 20 cm a flexible tongue with a length of a few cm is enough if it is positioned in the middle part of the short side about 6-9 cm from the corner section.

The flexible tongue could also be made of one single component as described in the embodiment above and with a thickness of about 1 mm only and could be used to connect floorboards with a thickness down to 4 mm.

Figure 14:
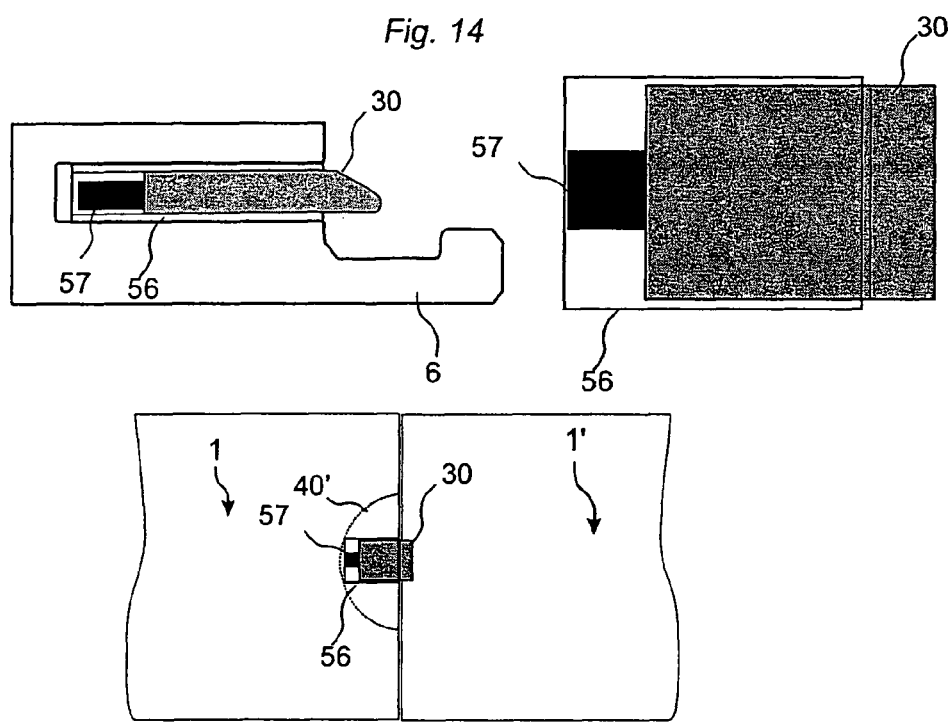
FIG. 14 show the flexible tongue in another embodiment according to the invention.

Al features of the embodiment described above could be combined with each other or used separately. The flexible tongues could be combined with all shown displacement or holding grooves. The locking systems could be used in any shown joint or floor panel. The system according to FIG. 14 could for example be used in floor panels described in FIGS. 10a-d. The tongue as shown in FIG. 7f could also have a shape as shown in FIG. 7b and it could be made to bend in the length direction where this bending is partly supported by a flexible material 38. The locking strips could in all embodiments be made of a separate material or in one piece. Part of the strip 6 in FIG. 14 could be removed under the plastic component 56 to facilitate fixing to the joint.

The method to produce a separate tongue which is inserted into a groove could of course be used to save material and improve friction properties even if the tongue is not flexible or displaceable. The methods and principle could also be used together with a flexible tongue that could be bent in vertical direction up and/or down during locking.

The system could be used to connect tile shaped panes installed on a wall and. The tile could be connected to each other and to a locking member fixed to the wall.

Although only preferred embodiments are specifically illustrated and described herein, it will be appreciated that many modifications and variations of the present invention are possible in light of the above teachings and within the purview of the appended claims without departing from the spirit and intended scope of the invention.

The invention claimed is:

1. A floor panel having an edge portion presenting a sidewardly open groove, in which a tongue formed as a separate part is received, wherein the tongue is bendable in a plane substantially parallel with a front face of the floor panel and bendable in a direction parallel to a direction in which the tongue is received in the groove, such that a part of the tongue is resiliently displaceable in said plane and wherein the width of the tongue varies in the longitudinal direction of the tongue, the longitudinal direction extending parallel to the edge portion and the front face of the floor panel.

2. The floor panel as claimed in claim 1, wherein the tongue along its length has at least two sections, wherein, during displacement of the tongue, said sections displace to different extents.

3. The floor panel as claimed in claim 2, wherein the tongue along its length has a middle section and two edge sections on both sides of the middle section, wherein the middle section is displaceable to a greater extent than the edge sections.

4. A tongue adapted for being received in a sidewardly open groove of an edge portion of a floor panel, wherein the tongue, which is of an elongated shape, when received in the groove is bendable in a plane substantially parallel with a front face of the floor panel and bendable in a direction parallel to a direction in which the tongue is received in the groove, such that the tongue is at least partially resiliently displaceable in said plane and wherein the width of the tongue, which is parallel to an insertion direction of the tongue into the groove, varies in the longitudinal direction of the tongue, the longitudinal direction extending parallel to the edge portion of the floor panel and the front face of the floor panel, and the tongue, when received in the groove, includes an upper displacement surface facing the front face of the floor panel and a lower displacement surface facing a rear face of the floor panel, and the upper displacement surface or the lower displacement surface has a beveled edge in the longitudinal direction.

5. The tongue as claimed in claim 4, wherein a protrusion is arranged at the upper displacement surface or at the lower displacement surface.

6. The tongue as claimed in claim 4, wherein the tongue is made of plastic and reinforced with fibres.

7. The tongue as claimed in claim 6, wherein plastic is PP or POM and the fibres are glass fibres.

8. A tongue adapted for being received in a sidewardly open groove of an edge portion of a floor panel, wherein the tongue, which is of an elongated shape, when received in the groove is displaceable in a plane substantially parallel with a front face of the floor panel and bendable in a direction parallel to a direction in which the tongue is received in the groove and wherein the width of the tongue, which is parallel to an insertion direction of the tongue into the groove, varies in the longitudinal direction of the tongue, the longitudinal direction extending parallel to the edge portion of the floor panel and the front face of the floor panel, and the tongue, when received in the groove, includes an upper displacement surface facing the front face of the floor panel and a lower displacement surface facing a rear face of the floor panel, and the upper displacement surface or the lower displacement surface has a beveled edge in the longitudinal direction.

9. The tongue as claimed in claim 8, wherein a protrusion is arranged at the upper displacement surface or at the lower displacement surface.

10. The tongue as claimed in claim 8, wherein the tongue is made of plastic and reinforced with fibres.

11. The tongue as claimed in claim 10, wherein the plastic is PP or POM and the fibres are glass fibres.

12. A floor panel having an edge portion presenting a sidewardly open groove, the floor panel comprising a tongue adapted for being received in the sidewardly open groove of the floor panel, wherein the tongue, which is of an elongated shape, when received in the groove is displaceable in a plane substantially parallel with a front face of the floor panel and parallel to a direction in which the tongue is received in the groove, wherein the width of the tongue, which is parallel to an insertion direction of the tongue into the groove, varies in the longitudinal direction of the tongue, the longitudinal direction being perpendicular to the width of the tongue and parallel to the front face of the floor panel.

13. The floor panel as claimed in claim 12, wherein the groove has a part which is rounded in the plane.

14. The floor panel as claimed in claim 12, wherein a protrusion is arranged at an upper surface or a lower surface of the tongue.

15. The floor panel as claimed in claim 12, wherein the groove has a lower part comprising a strip with a locking element.

16. The floor panel as claimed in claim 12, wherein the tongue is made of plastic and reinforced with fibres.

17. The floor panel as claimed in claim 16, wherein the plastic is PP or POM and the fibres are glass fibres.

18. A tongue adapted for being received in a sidewardly open groove of an edge portion of a floor panel, wherein the tongue, which is of an elongated shape, when received in the groove is displaceable in a plane substantially parallel with a front face of the floor panel, and wherein, the width of the tongue is parallel to an insertion direction of the tongue into the groove, the tongue is bow shaped in a direction parallel with the front face of the floor panel, and the tongue, when received in the groove, includes an upper surface facing the front face of the floor panel and a lower surface facing a rear face of the floor panel, and the upper surface or the lower surface has a beveled edge in a longitudinal direction, the longitudinal direction extending parallel to the edge portion and the front and rear faces of the floor panel.

19. The tongue as claimed in claim 18, wherein the width of the tongue varies in the longitudinal direction of the tongue.

20. The tongue as claimed in claim 18, wherein a protrusion is arranged at an upper surface or a lower surface of the tongue.

21. The tongue as claimed in claim 18, wherein the tongue is made of plastic and reinforced with fibres.

22. The tongue as claimed in claim 21, wherein the plastic is PP or POM and the fibres are glass fibres.

23. The floor panel as claimed in claim 1, wherein the width of the tongue varies in the longitudinal direction of the tongue before bending or displacing during insertion of the tongue into the sidewardly open groove and during locking of the floor panel with another floor panel.

24. The floor panel as claimed in claim 1, wherein the tongue is bendable to have at least one curve shape as viewed in plan view from above the front face of the floor panel, such that the curve arcs in a plane substantially parallel with the front face of the floor panel.

* * * * *